US011042597B2

(12) United States Patent
Bastide et al.

(10) Patent No.: US 11,042,597 B2
(45) Date of Patent: Jun. 22, 2021

(54) RISK-BASED COMPREHENSION INTERVENTION FOR IMPORTANT DOCUMENTS

(71) Applicant: International Business Machines Corporation, Armonk, NY (US)

(72) Inventors: Paul R. Bastide, Boxford, MA (US); Alexandra Urman, New York, NY (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 16/021,541

(22) Filed: Jun. 28, 2018

(65) Prior Publication Data

US 2020/0004885 A1    Jan. 2, 2020

(51) Int. Cl.
| | | |
|---|---|---|
| *G06F 16/00* | (2019.01) | |
| *G06F 7/00* | (2006.01) | |
| *G06F 16/9535* | (2019.01) | |
| *G06F 16/93* | (2019.01) | |
| *G06F 16/248* | (2019.01) | |
| *G06F 16/2457* | (2019.01) | |

(52) U.S. Cl.
CPC ........ *G06F 16/9535* (2019.01); *G06F 16/248* (2019.01); *G06F 16/24578* (2019.01); *G06F 16/93* (2019.01)

(58) Field of Classification Search
CPC ............. G06F 16/9535; G06F 16/93; G06F 16/24578; G06F 16/248
USPC ........................................................ 707/734
See application file for complete search history.

(56) References Cited

U.S. PATENT DOCUMENTS

| | | | |
|---|---|---|---|
| 2008/0319976 A1* | 12/2008 | Morris | G06F 16/9535 |
| 2012/0031670 A1 | 2/2012 | Trinh et al. | |
| 2012/0084096 A1* | 4/2012 | Wang | G06F 40/174 |
| | | | 705/2 |
| 2012/0226519 A1 | 9/2012 | Copeland | |
| 2014/0101086 A1* | 4/2014 | Lu | G06N 5/04 |
| | | | 706/46 |
| 2015/0081661 A1* | 3/2015 | White | G06F 16/248 |
| | | | 707/706 |

(Continued)

OTHER PUBLICATIONS

Al-Tayylb, Alia A., et. al., "Effect of Low Medical Literacy on Health Survey Measurements", American Journal of Public Health, vol. 92, No. 9, Sep. 2002.

*Primary Examiner* — Raquel Perez-Arroyo
(74) *Attorney, Agent, or Firm* — North Shore Patents, P.C.; Michele Liu Baillie

(57) ABSTRACT

In providing visual cues in a document, a server captures search term(s) input by a user and detects a user selection of a document returned based on the search term(s). The server determines a dataset describing the user, where the dataset includes the search term(s), the document, and a set of demographic data of the user. The server maps the dataset to a user group, where the user group is associated with an expertise level for a domain associated with the document. The server assigns the expertise level associated with the user group to the user and maps the expertise level of a risk model for the domain. The risk model is applied to the document to identify the content segments that may pose a risk of harm to a reader with the user's expertise level. The document with the visual cues can then be displayed to the user.

14 Claims, 6 Drawing Sheets

(56) References Cited

U.S. PATENT DOCUMENTS

| | | | |
|---|---|---|---|
| 2015/0186546 A1* | 7/2015 | Rechterman | H04L 67/02 |
| | | | 715/234 |
| 2015/0213634 A1 | 7/2015 | Karmarkar et al. | |
| 2016/0232805 A1 | 8/2016 | Gibson et al. | |
| 2016/0253480 A1 | 9/2016 | Cornish | |
| 2017/0228501 A1 | 8/2017 | Turner, et al. | |
| 2017/0316774 A1 | 11/2017 | Sharifi et al. | |
| 2018/0341378 A1* | 11/2018 | Morrow | G06F 3/0481 |

* cited by examiner

Women's Heart Attack Research Program: Platelet Sub-Study (HARP) (HARP)

This study is currently recruiting participants. (see Contacts and Locations)
Verified January 2017 by New York University School of Medicine Sponsor:
New York University School of Medicine Information provided by (Responsible Party):
New York University School of Medicine ClinicalTrials.gov Identifier:
NCT03022552

First received: January 13, 2017
Last updated: NA
Last verified: January 2017
History: No changes posted Full Text View | Tabular View | No Study Results Posted | Disclaimer | How to Read a Study Record ▶ Purpose This prospective observational cohort study, will investigate the platelet phenotype, platelet genetic composition, and role of platelets as effector cells in women with myocardial infarction (MINOCA or MI-CAD) and controls. The study, which will take place at NYU and Bellevue Medical Center, may have concurrent enrollment with the HARP Main Imaging (NCT02914483) and HARP Stress Ancillary Studies (NCT02270359). Additionally, a group of age and race matched disease controls 'CATH-NOCA' composed of women with stable angina referred for cardiac catheterization, will be enrolled. Blood obtained during the initial catheterization, 2 months post-MI, and following the stress study (for those participants enrolled in the stress study) will be utilized for platelet testing.

| Condition |
|---|
| Myocardial Infarction |

This prospective observational cohort study, will investigate the platelet phenotype, platelet genetic composition, and role of platelets as effector cells in women with myocardial infarction (MINOCA or MI-CAD) and controls. This study, which will take place at NYU and Bellevue Medical Center, may have concurrent enrollment with the HARP Main Imaging (NCT02914483) and HARP Stress Ancillary Studies (NCT02270359). Additionally, a group of age and race matched disease controls 'CATH-NOCA' composed of women with stable angina referred for cardiac catheterization, will be enrolled. Blood obtained during the initial catheterization, 2 months post-MI, and following the stress study (for those participants enrolled in the stress study) will be utilized for platelet testing.

RISK-BASED COMPREHENSION INTERVENTION FOR IMPORTANT DOCUMENTS

BACKGROUND

Vast amounts of documents and website content are available on the Internet, providing a wide variety in the quality and ease of consumption of information. When documents and websites contain foreign, complex, and/or unfamiliar language, users may struggle to understand important terms or concepts. For instance, users who search for medical information may search for information using keywords which are familiar. However, providers of the documents or websites do not evaluate user comprehension levels. Therefore, some users are unable to fully understand the content. In some domains, such as the medical domain, this lack of comprehension may lead to a risk of harm to the user.

SUMMARY

Disclosed herein is a method for providing visual cues in a document for enhanced risk comprehension, and a computer program product and system as specified in the independent claims. Embodiments of the present invention are given in the dependent claims. Embodiments of the present invention can be freely combined with each other if they are not mutually exclusive.

According to an embodiment of the present invention, a server captures a set of one or more search terms input by a user and detects a user selection of a document of a plurality of documents returned based on the search term(s). The server determines a dataset describing the user, where the dataset includes the search term(s), the selected document, and a set of demographic data of the user. The server maps the dataset to a given user group of a plurality of user groups, where the given user group is associated with an expertise level for a domain associated with the selected document. The server assigns the expertise level associated with the given user group to the user and maps the expertise level of a given risk model for the domain of a plurality of risk models. The server applies one or more visual cues to one or more content segments of the selected document based on the given risk model.

BRIEF DESCRIPTION OF THE DRAWINGS

FIG. 3 illustrates a view of a clinical trials website in an example according to some embodiments.

FIG. 4 illustrates a view of the search results in an example according to some embodiments.

FIG. 5 illustrates a view of contents of the selected document displayed by the browser in an example according to some embodiments.

FIG. 6 illustrates a view of a portion of the document with the visual cues applied to content segments of the document in an example according to some embodiments.

FIG. 7 illustrates a view of the document with a risk of understanding score in an example according to some embodiments.

FIG. 8 illustrates a view of the document with buttons applied to a term in an example according to some embodiments.

DETAILED DESCRIPTION

Figure 1:
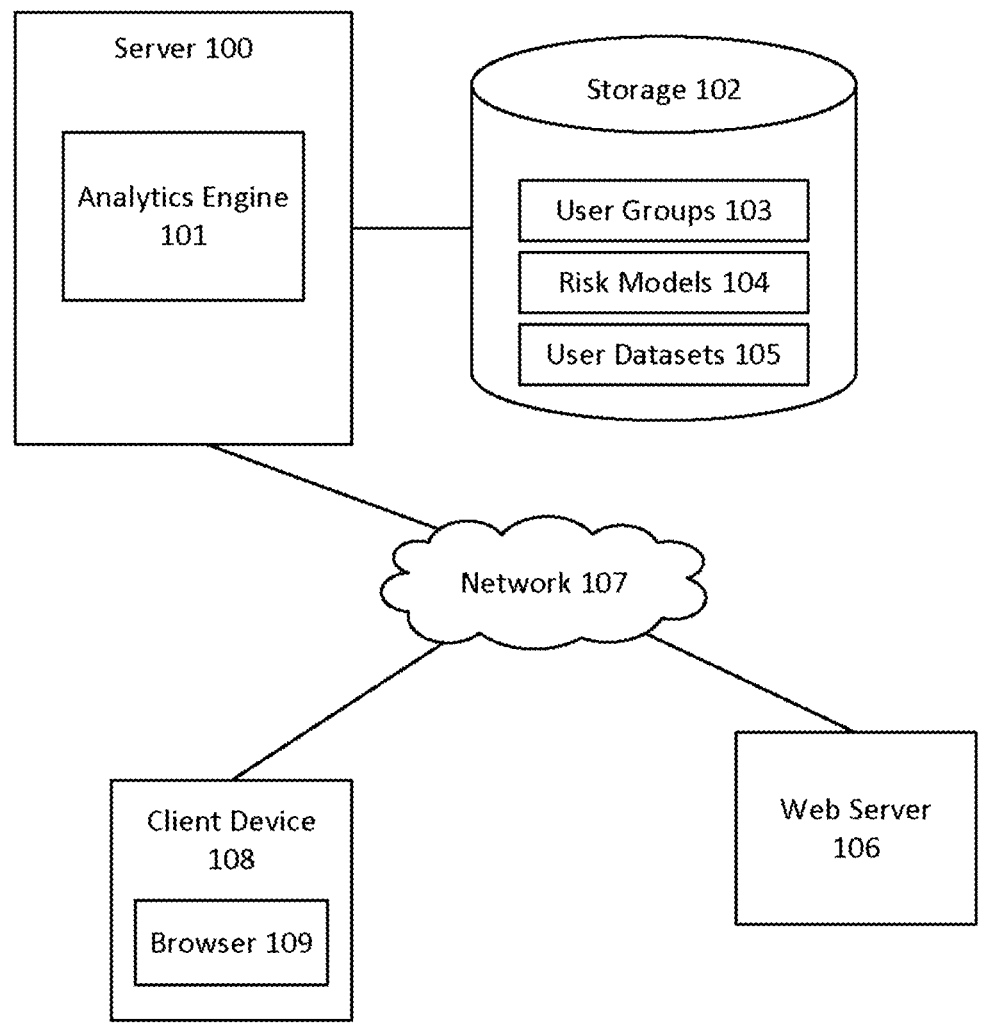
FIG. 1 illustrates an example computing environment for providing visual cues in a document for enhanced risk comprehension according to some embodiments.

FIG. 1 illustrates an example computing environment for providing visual cues in a document for enhanced risk comprehension according to some embodiments. The computing environment includes a client device 108 with a browser 109 for accessing a website hosted by a web server 106. A server 100 with an analytics engine 101 provides an enhanced risk comprehension service integrated with a website and/or installed on the client device 108 as part of the browser 109 or a document viewer (not shown) at the client device 108. A "document" in this embodiment is content provided by a content provider over a network 107, such as the Internet. In providing the service, the analytics engine 101 uses a plurality of user groups 103, a plurality of risk models 104, and a plurality of user datasets 105, stored in a storage 102, as described further below. The server 100, client device 108, and web server 106 communicate over the network 107.

Figure 2:
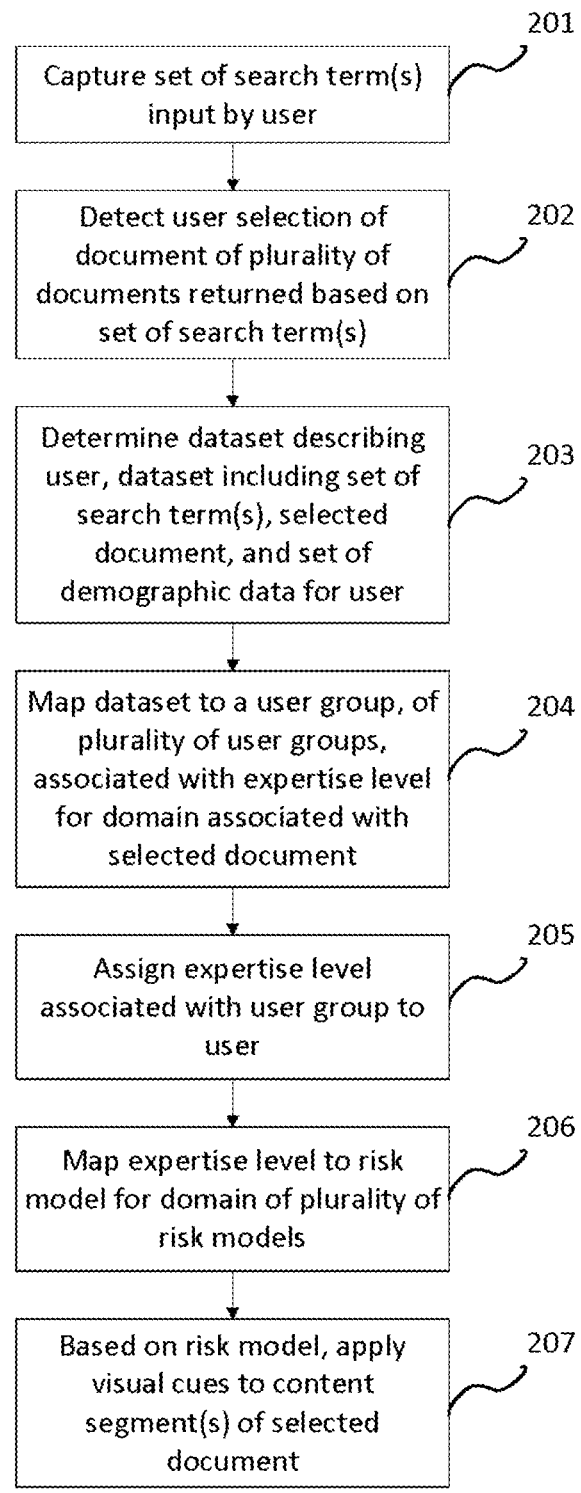
FIG. 2 illustrates a method for providing visual cues in a document for enhanced risk comprehension according to some embodiments.

FIG. 2 illustrates a method for providing visual cues in a document for enhanced risk comprehension according to some embodiments. When a user of the client device 108 accesses a website hosted by the web server 106 via the browser 109, the user may search for documents of interest by entering a set of one or more search terms, comprising one or more words, into the website. Assume for example, that the website and/or the browser 109 has integrated within it the enhanced risk comprehension service provided by the server 100. In one exemplary embodiment, integration occurs client side, as an extension, plugin, or using ActiveX with the browser 109. The integration may further include the use of tracking cookies. In another exemplary embodiment, the integration may be implemented as an add-in to a document viewer application at the client device 108. In another exemplary embodiment, the integration may be implemented server side as a page fragment aggregated on the client rendered webpage. In another exemplary embodiment, the functionality may be implemented server side 100 across the user's session with the web server 106. The analytics engine 101 captures the set of search terms input by the user (201). After the website returns a search result containing a plurality of documents based on the set of search terms, the analytics engine 101 detects the selection of a document of the plurality of documents by the user (202). The document contains risk information, i.e., information in which a lack of understanding of the information may pose a risk of harm to the reader. The analytics engine 101 then determines a dataset describing the user (203). The dataset may include one or more of: the set of search terms input by the user; the selected document; and a set of demographic data for the user. Example demographics for the user may include, but is not limited to, one or more of the following: location; IP address; gender; age; medical history; cognitive capabilities; education level; and job history. In a scenario where demographic data for the user is not available, the set of demographic data may be null. Information concerning the user or the client device 108 may also be gathered from browser data, such as through the use of cookies, and included in the dataset. Optionally, a survey may be generated by the server 100 and sent to the browser 109, and the answers to the survey are then included in the dataset.

Once the dataset describing the user is determined, the analytics engine 101 maps the dataset to a user group of the plurality of user groups 103, where the user group is associated with an expertise level for the domain associated with the selected document (204). The document's domain may be determined using an ontology-based document classification technique. The analytics engine 101 then assigns the expertise level associated with the user group to the user (205). In an exemplary embodiment, in mapping the user's dataset to the user group, the analytics engine 101 compares the user's dataset with parameters for one or more of the plurality of user groups 103. Each of the plurality of user groups 103 is associated with a level of expertise in the domain associated with the selected document. The plurality of user groups 103 may be built through the analysis of the user datasets 105 associated with other users from previous searches and improved over time using cognitive learning algorithms. In an exemplary embodiment, the analytics engine 101 calculates a similarity score between the user's dataset and one or more of the plurality of user groups 103. When the similarity score for a given user group exceeds a configurable similarity score threshold, the analytics engine 101 maps the user's dataset to this user group and assigns the expertise level associated with the user group to the user. When the similarity score for the given user group does not exceed the similarity score threshold, the process may be repeated for the next user group in the plurality of user groups 103 until the similarity score threshold is exceeded. If the similarity score threshold is not exceeded for any of the plurality of user groups 103, then the analytics engine 101 may be configured to assign a default expertise level to the user.

For example, assume that the parameters for a user group includes a combination of a neighborhood (location), an age range, and an average education level. Assume that the user group is associated with an expert level for the domain associated with the selected document. The similarity score may be based on a combination of the user's closeness to the location, whether the user is within the age range, and whether the user's education level is above or below the average education level. If the similarity score exceeds the configured similarity score threshold, then the analytics engine 101 determines that the user's dataset maps to this user group. The user's dataset may then be added to the plurality of user groups 103 and stored as part of the user datasets 105. In this way, a feedback loop is created such that the accuracy of the plurality of user groups 103 are continually improved upon.

In an exemplary embodiment, the analytics engine 101 may have access to an ontology database (not shown), in which each term is associated with a set of domains, and each domain in the set is associated with an expertise level. The analytics engine 101 compares the set of search terms input by the user with the terms in the ontology database. When one or more matches are found, the analytics engine 101 compares the domain associated with the selected document with the set of domains associated with the matching term. The analytics engine 101 may adjust the expertise level of the user using the expertise level associated with the matching domain. Optionally, when the similarity score, calculated as described above, is not exceeded for any of the plurality of user groups 103, the expertise level associated with the matching domain may be assigned to the user instead of applying a default expertise level.

In an exemplary embodiment, the history of the selected document may be considered. For example, the analytics engine 101 may have access to a history of document selections by domain experts. When the analytics engine 101 finds that the selected document has a history of being selected by experts in the domain, the analytics engine 101 may adjust the expertise level of the user higher.

In an exemplary embodiment, the referral source may be considered. For example, the analytics engine 101 may have access to a referral source database (not shown) containing referral sources, each associated with an expertise level for a set of domains. For example, if the domain is 'medical', a medical journal commonly read by medical experts may be associated with an expert level for the medical domain, while a lay publication may be associated with a lay level of expertise for the medical domain. When the analytics engine 101 determines that the matching domain for the referral source is associated with an expert level, the analytics engine 101 may adjust the expertise level of the user higher. Similarly, when the matching domain for the referral source is associated with a lay level of expertise, the analytics engine 101 may keep the expertise level of the user the same or adjust it lower.

Once an expertise level is assigned to the user, the analytics engine 101 maps the expertise level to a risk model of the plurality of risk models 104 for the domain associated with the document (206). The risk model captures the words, phrases, or concepts in the domain in which a lack of understanding may pose a risk of harm to readers. In an exemplary embodiment, each risk model of the plurality of risk models 104 is associated with a domain. The analytics engine 101 compares the domain associated with the document with the domain associated with a given risk model. The expertise level assigned to the user is then mapped to the given risk model. Based on the risk model, visual cues are applied to one or more content segments of the selected document, to assist the user's comprehension of the risk information in the selected document (207). Each content segment may contain a word, a phrase, an image, a video, or other method of conveying information in the selected document. In an exemplary embodiment, the risk model is applied to the selected document to identify the content segments that may pose a risk of harm to a reader with the user's expertise level. A visual cue is then applied to each content segment identified by the analytics engine 101. The selected document with the visual cues can then be displayed to the user. Example visual cues may include the highlighting of text, replacement of text with other or simpler forms of text, applying a semantic tag to the content segment with a potential discussion forum or people to contact for further information, and the highlighting of other relevant documents. In an exemplary embodiment, the visual cues may include a calculated overall risk of understanding score. The risk of understanding score represents an overall level of harm to a reader with the user's expertise level if there is a lack of understanding of the content segments in the selected document. In an exemplary embodiment, the calculation of the risk of understanding score begins with a baseline score using a certain set of user demographic data, and the risk of understanding score is calculated relative to this baseline score. In other exemplary embodiments, the risk of understanding score is calculated based on a set of surveyed demographic data which indicates a user's risk of understanding, based on an expert-determined risk model, or using natural language associations between the user's set of search terms and a risk level.

In an exemplary embodiment, once the selected document with the visual cues are displayed by the browser 109, the analytics engine 101 may track the user's interaction with the selected document. For example, the dwell time on a given content segment, such as based on eye gaze or mouse hover/movement, may be considered. A long dwell time on a given content segment may indicate a lack of understanding by the user. A threshold dwell time may be configured such that when the dwell time exceeds the threshold, the analytics engine 101 responds by prompting the user to confirm his or her understanding or respond by displaying further resources for the user to gain further understanding. The dwell time can then be added to the user's dataset. Optionally, the analytics engine 101 can update the mapping of the user's dataset to a user group of the plurality of user groups 103 based on the dwell time, using the process described above, and change the application of visual cues accordingly.

Figures 3, 4:
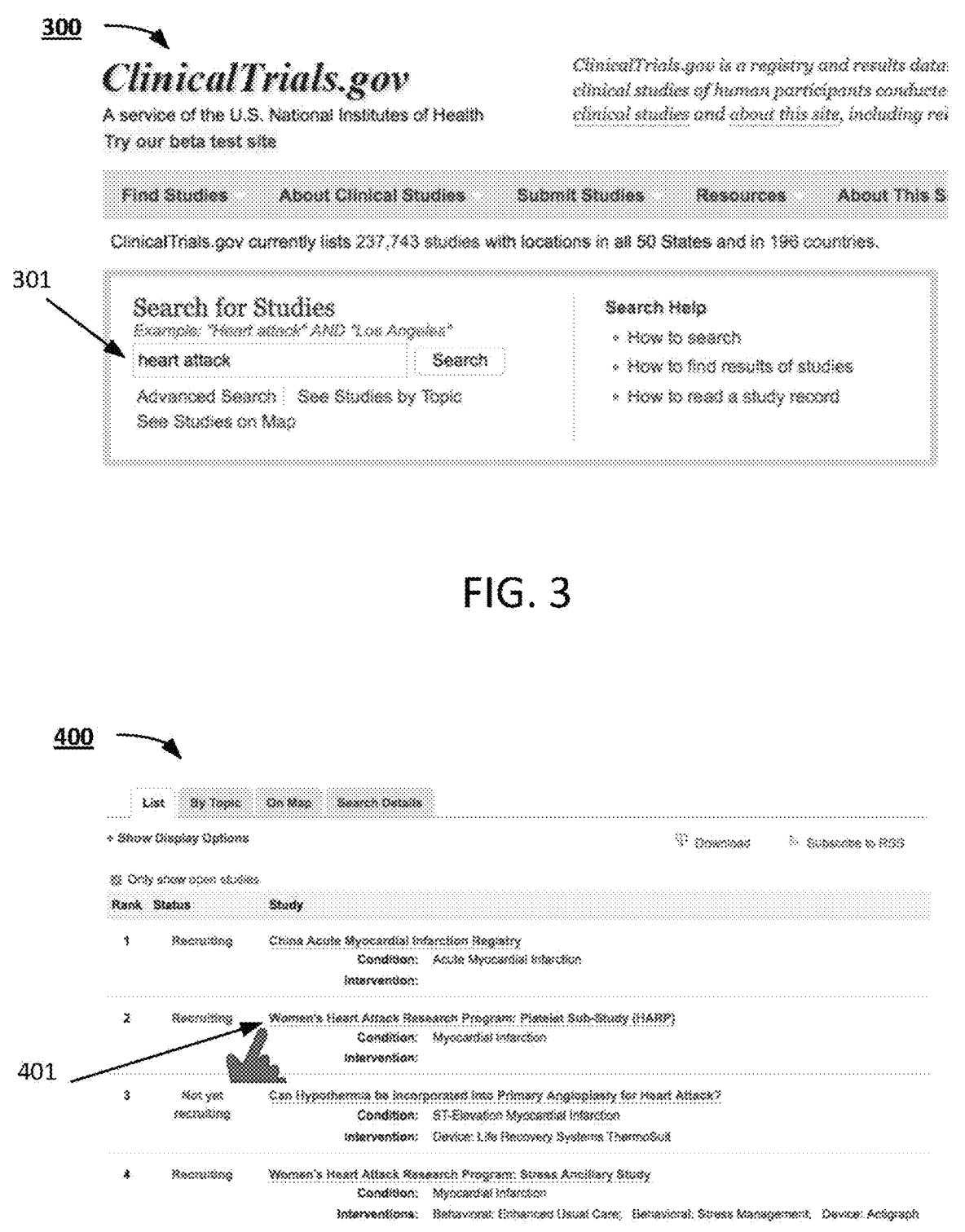

FIGS. 3-8 illustrates an example of applying visual cues to a document according to some embodiments. Assume in this example that Alice, the user of the client device 108, via the browser 109, is in search of a clinical trial for a family member who has suffered a heart attack. Assume also that Alice is a user without medical education or training. Alice accesses the website at "ClinicalTrials.gov", which is integrated with an embodiment of the present invention and is associated with the "medical" domain. The analytics engine 101 begins monitoring Alice's session with the website as determined by a session identifier, such as a cookie or a stateless server-side identification. FIG. 3 illustrates an example view of the clinical trials website 300. Assume that the website 300 includes a search field 301, into which Alice enters "heart attack" as the search terms. Referring also to FIG. 2, the analytics engine 101 captures the search terms, "heart attack", inputted by Alice (201) and stores "heart attack" as part of Alice's dataset. The website 300 then displays a plurality of documents returned as the search results for "heart attack". FIG. 4 illustrates an example view of the search results 400. Assume that Alice selects document 401 from the search results 400. The document 401 includes risk information concerning heart attacks. The analytics engine 101 detects Alice's selection of the document 401 (202) and stores the selection as part of Alice's dataset. The document 401 is then displayed via the browser 109. FIG. 5 illustrates an example view of the contents of the selected document 401 displayed by the browser 109.

The analytics engine 101 then executes a detection routine to determine Alice's demographic data and stores the demographics data as part of Alice's dataset (203). Assume in this example that the dataset includes: IP address=192.168.0.1 (IP address of the client device 108); search term="heart attack"; and document="doc 2" (identifier for the document 401). Assume that the analytics engine 101 maps Alice's dataset to a user group associated with a "lay user" expertise level for the medical domain (204). The analytics engine 101 thus assigns the "lay user" expertise level to Alice (205). The analytics engine 101 then maps the "lay user" expertise level to a risk model for the medical domain (206).

Based on the mapping of the "lay user" expertise level to the risk model, the analytics engine 101 applies visual cues to one or more content segments of the document 401 (207), and the document 401 with the visual cues are displayed via the browser 109 or a document viewer at the client device 108. FIG. 6 illustrates an example view of a portion of the document 401 with the visual cues applied to content segments of the document 401. In this example, per the risk model, the terms, "platelet phenotype" 601, "platelet genetic composition" 602, and "myocardial infarction" 603 are identified to have a high risk of harm for a lay user expertise level. In this example, these terms 601, 602, 602 are highlighted, however, other types or combinations of visual cues may be used instead. For example, "myocardial infarction" 603 may be identified by the risk model as having a higher risk of harm than "platelet phenotype" 601 and "platelet genetic composition" 602, and thus, "myocardial infarction" 603 can be highlighted differently.

Figures 7, 8:
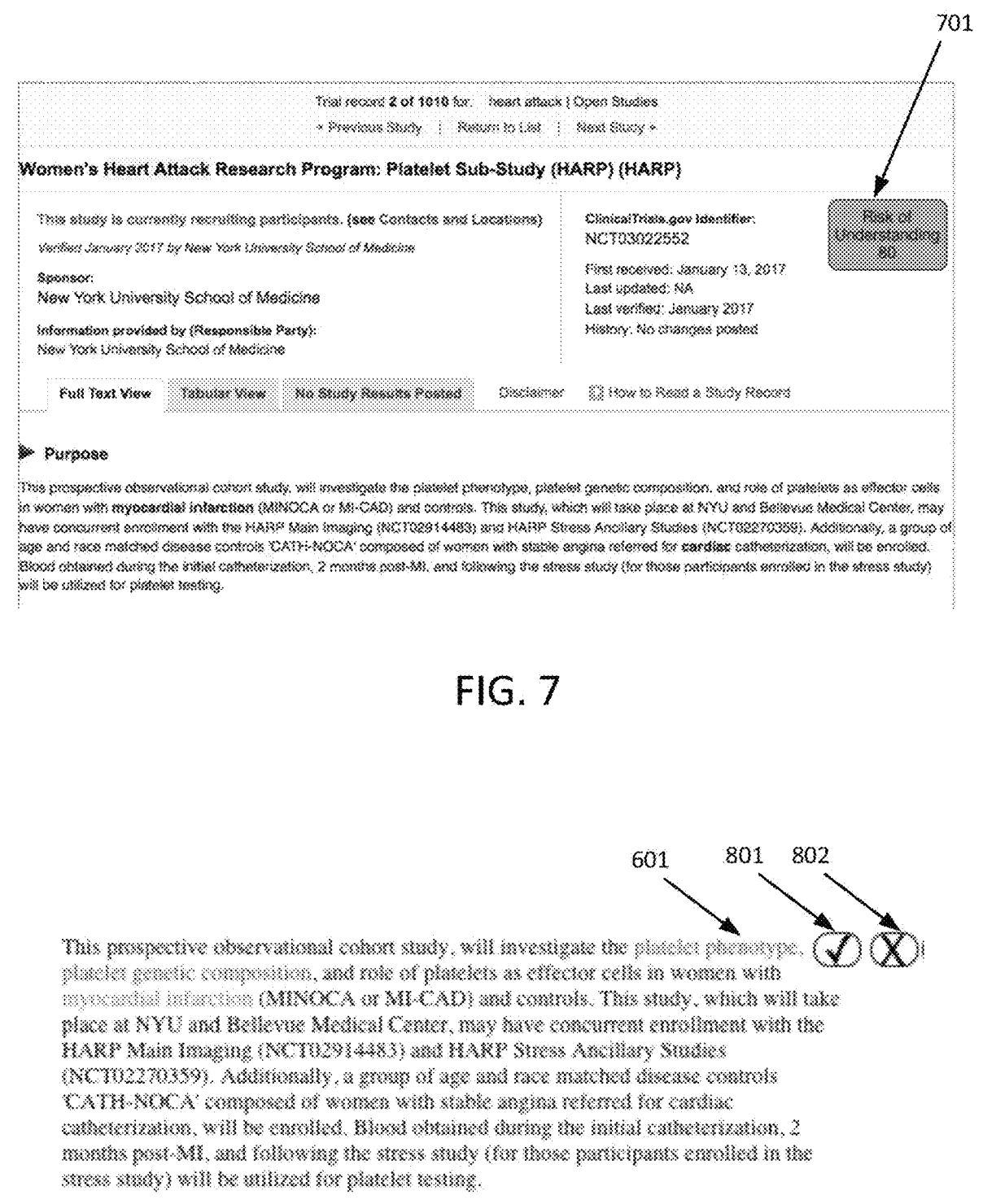

In an exemplary embodiment, the visual cues include a calculated overall risk of understanding score. The risk of understanding score represents an overall level of harm to a reader with the user's expertise level if there is a lack of understanding of the content segments in the selected document 401. FIG. 7 illustrates an example view of the document 401 with a risk of understanding score 701. Assume that the risk of understanding score for the document 401 is calculated to be '80' for Alice, indicating a high risk of harm for Alice as a lay user if the risk information in the document 401 is not properly understood by Alice.

As Alice reads the document 401, the analytics engine 101 continues to monitor Alice's interactions with the website 300 and uses the data collected to continue building Alice's dataset. For example, the analytics engine 101 records Alice's dwell time with highlighted content segment, using eye gaze, points, or interpolated dwell time through cursor movement. Optionally, a visual cue may be applied to the document 401 to prompt Alice to confirm her understanding of the highlighted content segment once the dwell time has passed. FIG. 8 illustrates an example view of the document 401 with a 'yes' button 801 and a 'no' button 802 applied to the term "platelet phenotype". Alice may then select the appropriate button to indicate whether she understands the term "platelet phenotype". The analytics engine 101 records Alice's response and stores the response as part of Alice's dataset. Optionally, Alice's expertise level may be recalculated, and the visual cues in the document 401 may be updated accordingly.

Figure 9:
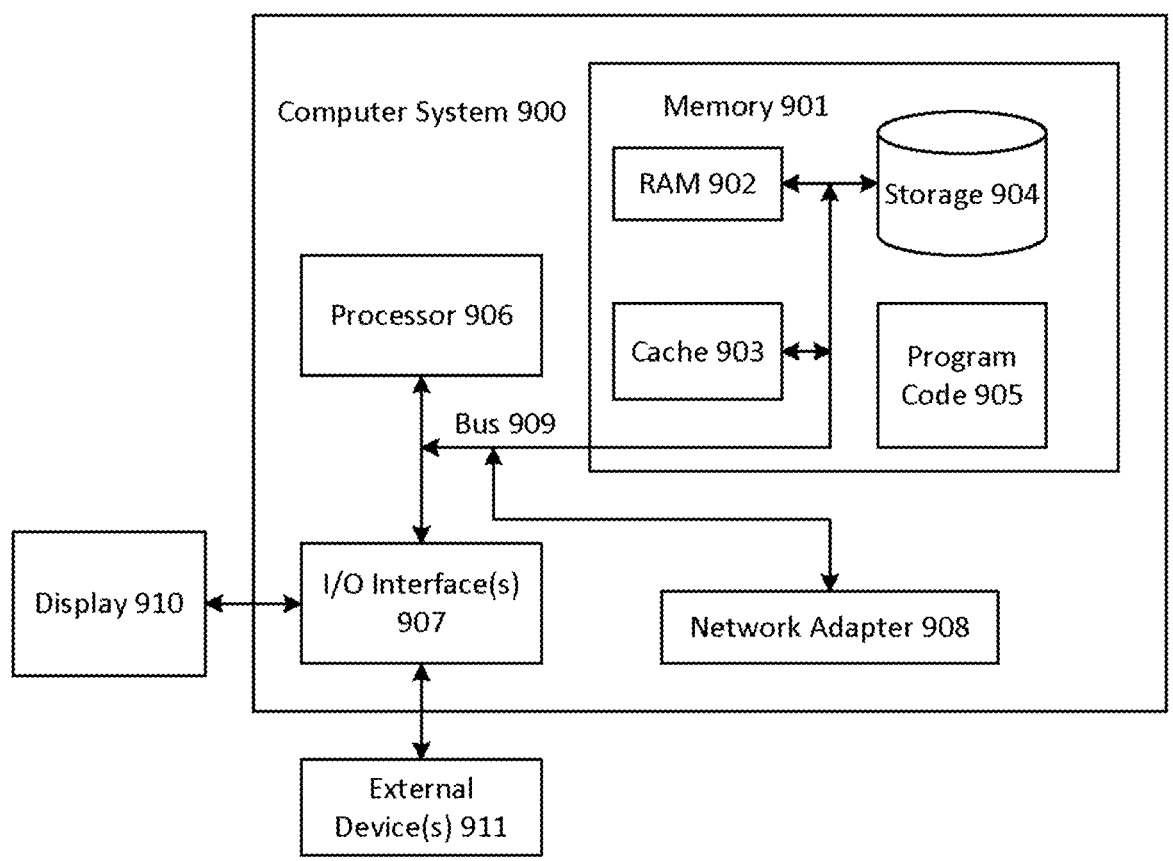
FIG. 9 illustrates an example computer system, which may be used for some embodiments described herein

FIG. 9 illustrates an example computer system, which may be used for some embodiments described herein. The computer system 900 is operationally coupled to a processor or processing units 906, a memory 901, and a bus 909 that couples various system components, including the memory 901 to the processor 906. The bus 909 represents one or more of any of several types of bus structure, including a memory bus or memory controller, a peripheral bus, an accelerated graphics port, and a processor or local bus using any of a variety of bus architectures. The memory 901 may include computer readable media in the form of volatile memory, such as random access memory (RAM) 902 or cache memory 903, or non-volatile storage media 904. The memory 901 may include at least one program product having a set of at least one program code module 9 that are configured to carry out the functions of embodiment of the present invention when executed by the processor 906. The computer system 900 may also communicate with one or more external devices 911, such as a display 910, via 110 interfaces 907. The computer system 900 may communicate with one or more networks via network adapter 908.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing visual cues in a document by a server, comprising:

capturing, by the server, a set of one or more search terms input by a user;

after a display of a search result comprising a plurality of documents based on the set of one or more search terms, detecting, by the server, a user selection of a document of the plurality of documents in the search result, the selected document comprising a plurality of content segments;

determining, by the server, a dataset describing the user, the dataset comprising the set of one or more search terms, the selected document, and a set of demographic data of the user;

mapping, by the server, the dataset to a first given user group of a plurality of user groups, the first given user group being associated with a first expertise level for a domain associated with the selected document;

assigning, by the server, the first expertise level associated with the first given user group to the user;

mapping, by the server, the first expertise level to a first given risk model for the domain of a plurality of risk models;

identifying, by the server, a first set of content segments of the plurality of content segments that would pose a risk of harm to the reader with the first expertise level assigned to the user based on the first given risk model;

applying, by the server, a first set of visual cues to the first set of content segments comprised in the selected document;

displaying, by the server, the selected document with the first set of visual cues applied to the first set of content segments;

measuring, by the server, a dwell time of the user on a given content segment of the first set of content segments displayed with a given visual cue of the first set of visual cues; and updating, by the server, the display of the selected document based on the dwell time, comprising:

updating, by the server, the dataset describing the user by adding the dwell time to the dataset;

mapping, by the server, the updated dataset to a second given user group of the plurality of user groups, the second given user group being associated with a second expertise level for the domain associated with the selected document;

assigning, by the server, the second expertise level associated with the second given user group to the user;

mapping, by the server, the second expertise level to a second given risk model for the domain of the plurality of risk models;

identifying, by the server, a second set of content segments of the plurality of content segments that would pose a risk of harm to the reader with the second expertise level assigned to the user based on the second given risk model;

applying, by the server, a second set of visual cues to the second set of content segments comprised in the selected document; and updating, by the server, the display of the selected document with the second set of visual cues applied to the second set of content segments.

2. The method of claim 1, wherein the mapping of the dataset to the first given user group comprises:

determining, by the server, the domain associated with the selected document;

comparing, by the server, the dataset with parameters for one or more of the plurality of user groups, wherein each of the plurality of user groups is associated with a level of expertise in the domain;

calculating, by the server, a similarity score based on the comparing with the first given user group of the plurality of user groups; and when the similarity score exceeds a similarity score threshold, assigning, by the server, the first level of expertise associated with the first given user group to the user.

3. The method of claim 1, wherein the assigning of the first expertise level of the first given user group to the user comprises:

comparing, by the server, the set of one or more search terms with a plurality of terms in an ontology database, wherein each term in the ontology database is associated with a set of domains, wherein each domain in the set is associated with a third expertise level;

when the set of one or more search terms matches a given term in the ontology database, comparing, by the server, the domain associated with the selected document with the set of domains associated with the given term; and adjusting, by the server, the first expertise level assigned to the user according to the third expertise level associated with the matching domain.

4. The method of claim 1, wherein the dataset further comprises a referral source, wherein the assigning of the first expertise level of the first given user group to the user comprises:

comparing, by the server, the referral source with a plurality of referral sources in a referral source database, wherein each referral source in the referral source database is associated with a set of domains, wherein each domain in the set is associated with a third expertise level;

when the referral source matches a given referral source in the referral source database, comparing, by the server, the domain associated with the selected document with the set of domains associated with the given referral source; and adjusting, by the server, the first expertise level assigned to the user according to the third expertise level associated with the matching domain.

5. The method of claim 1, wherein the identifying of the first set of content segments comprises:

calculating, by the server, an overall risk of understanding score representing an overall level of risk of harm to a reader with the first expertise level assigned to the user with lack of understanding of the first set of content segments in the selected document.

6. A computer program product for providing visual cues in a document, the computer program product comprising a computer readable storage medium having program instructions embodied therewith, the program instructions executable by a processor to cause the processor to:

capture a set of one or more search terms input by a user;

after a display of a search result comprising a plurality of documents based on the set of one or more search terms, detect a user selection of a document of the plurality of documents in the search result, the selected document comprising a plurality of content segments;

determine a dataset describing the user, the dataset comprising the set of one or more search terms, the selected document, and a set of demographic data of the user;

map the dataset to a first given user group of a plurality of user groups, the first given user group being associated with a first expertise level for a domain associated with the selected document;
assign the first expertise level associated with the first given user group to the user;
map the first expertise level to a first given risk model for the domain of a plurality of risk models for the domain;
identify a first set of content segments of the plurality of content segments that would pose a risk of harm to the reader with the first expertise level assigned to the user based on the first given risk model;
apply a first set of visual cues to the first set of content segments comprised in the selected document;
display the selected document with the first set of visual cues applied to the first set of content segments;
measure a dwell time of the user on a given content segment of the first set of content segments displayed with a given visual cue of the first set of visual cues; and
update the display of the selected document based on the dwell time, comprising:
 update the dataset describing the user by adding the dwell time to the dataset;
 map the updated dataset to a second given user group of the plurality of user groups, the second given user group being associated with a second expertise level for the domain associated with the selected document;
 assign the second expertise level associated with the second given user group to the user;
 map the second expertise level to a second given risk model for the domain of the plurality of risk models;
 identify a second set of content segments of the plurality of content segments that would pose a risk of harm to the reader with the second expertise level assigned to the user based on the second given risk model;
 apply a second set of visual cues to the second set of content segments comprised in the selected document; and
 update the display of the selected document with the second set of visual cues applied to the second set of content segments.

7. The computer program product of claim 6, wherein the mapping of the dataset to the first given user group comprises:
 determine the domain associated with the selected document;
 compare the dataset with parameters for one or more of the plurality of user groups, wherein each of the plurality of user groups is associated with a level of expertise in the domain;
 calculate a similarity score based on the comparing with the given user group of the plurality of user groups; and
 when the similarity score exceeds a similarity score threshold, assign the first level of expertise associated with the first given user group to the user.

8. The computer program product of claim 6, wherein the assigning of the first expertise level of the first given user group to the user comprises:
 compare the set of one or more search terms with a plurality of terms in an ontology database, wherein each term in the ontology database is associated with a set of domains, wherein each domain in the set is associated with a third expertise level;
 when the set of one or more search terms matches a given term in the ontology database, compare the domain associated with the selected document with the set of domains associated with the given term; and
 adjust the expertise level assigned to the user according to the third expertise level associated with the matching domain.

9. The computer program product of claim 6, wherein the dataset further comprises a referral source, wherein the assigning of the first expertise level of the first given user group to the user comprises:
 compare the referral source with a plurality of referral sources in a referral source database, wherein each referral source in the referral source database is associated with a set of domains, wherein each domain in the set is associated with a third expertise level;
 when the referral source matches a given referral source in the referral source database, compare the domain associated with the selected document with the set of domains associated with the given referral source; and
 adjust the first expertise level assigned to the user according to the third expertise level associated with the matching domain.

10. The computer program product of claim 6, wherein the identifying of the first set of content segments comprises:
 calculate an overall risk of understanding score representing an overall level of risk of harm to a reader with the first expertise level assigned to the user with lack of understanding of the first set of content segments in the selected document.

11. A system comprising:
a processor; and
a computer readable storage medium having program instructions embodied therewith, the program instructions executable by the processor to cause the processor to:
capture a set of one or more search terms input by a user;
after a display of a search result comprising a plurality of documents based on the set of one or more search terms, detect a user selection of a document of the plurality of documents in the search results, the selected document comprising a plurality of content segments;
determine a dataset describing the user, the dataset comprising the set of one or more search terms, the selected document, and a set of demographic data of the user;
map the dataset to a first given user group of a plurality of user groups, the first given user group being associated with a first expertise level for a domain associated with the selected document;
assign the first expertise level associated with the first given user group to the user;
map the first expertise level to a first given risk model for the domain of a plurality of risk models for the domain;
identify a first set of content segments of the plurality of content segments that would pose a risk of harm to the reader with the first expertise level assigned to the user based on the first given risk model;
apply a first set of visual cues to the first set of content segments comprised in the selected document;
display the selected document with the first set of visual cues applied to the first set of content segments;
measure a dwell time of the user on a given content segment of the first set of content segments displayed with a given visual cue of the first set of visual cues; and
update the display of the selected document based on the dwell time, comprising:

update the dataset describing the user by adding the dwell time to the dataset;

map the updated dataset to a second given user group of the plurality of user groups, the second given user group being associated with a second expertise level for the domain associated with the selected document;

assign the second expertise level associated with the second given user group to the user;

map the second expertise level to a second given risk model for the domain of the plurality of risk models;

identify a second set of content segments of the plurality of content segments that would pose a risk of harm to the reader with the second expertise level assigned to the user based on the second given risk model;

apply a second set of visual cues to the second set of content segments comprised in the selected document; and update the display of the selected document with the second set of visual cues applied to the second set of content segments.

12. The system of claim 11, wherein the mapping of the dataset to the first given user group comprises:

determine the domain associated with the selected document;

compare the dataset with parameters for one or more of the plurality of user groups, wherein each of the plurality of user groups is associated with a level of expertise in the domain;

calculate a similarity score based on the comparing with the given user group of the plurality of user groups; and when the similarity score exceeds a similarity score threshold, assign the first level of expertise associated with the first given user group to the user.

13. The system of claim 11, wherein the assigning of the first expertise level of the first given user group to the user comprises:

compare the set of one or more search terms with a plurality of terms in an ontology database, wherein each term in the ontology database is associated with a set of domains, wherein each domain in the set is associated with a third expertise level;

when the set of one or more search terms matches a given term in the ontology database, compare the domain associated with the selected document with the set of domains associated with the given term; and adjust the expertise level assigned to the user according to the third expertise level associated with the matching domain.

14. The system of claim 11, wherein the dataset further comprises a referral source, wherein the assigning of the first expertise level of the first given user group to the user comprises:

compare the referral source with a plurality of referral sources in a referral source database, wherein each referral source in the referral source database is associated with a set of domains, wherein each domain in the set is associated with a third expertise level;

when the referral source matches a given referral source in the referral source database, compare the domain associated with the selected document with the set of domains associated with the given referral source; and adjust the first expertise level assigned to the user according to the third expertise level associated with the matching domain.

* * * * *